United States Patent [19]
Barckhausen

[11] 3,859,173

[45] Jan. 7, 1975

[54] VERTICAL, MULTISTAGE-FLASH, FALLING FILM COLUMN FOR DISTILLING BRINE

[75] Inventor: Raymond Barckhausen, Paris, France

[73] Assignee: Societe Generale D'Enterprises, Paris, France

[22] Filed: Jan. 29, 1973

[21] Appl. No.: 327,698

[30] Foreign Application Priority Data
Jan. 27, 1972 France .............................. 72.02729

[52] U.S. Cl. ................. 202/173, 202/180, 202/187, 202/189, 202/195, 202/236, 159/13, 159/18

[51] Int. Cl. ....... B01d 3/02, B01d 3/08, B01d 3/00, B01d 3/28, F28b

[58] Field of Search ............. 159/18, DIG. 15, 13 R, 159/2 MS, 13 A, 6 W; 203/89, 10, 11; 202/158, 236, 173, 267; 261/DIG. 11

[56] References Cited
UNITED STATES PATENTS

| 520,994 | 6/1894 | Kessler | 202/153 |
| 1,105,443 | 7/1914 | Lougher | 159/18 |
| 1,845,159 | 2/1932 | Lea | 159/18 UX |
| 3,054,444 | 9/1962 | Robbins | 159/6 W |
| 3,324,012 | 6/1967 | Roe et al. | 203/11 |
| 3,458,404 | 7/1969 | Vincent et al. | 203/89 |
| 3,503,853 | 3/1970 | Taubert et al. | 202/173 |
| 3,755,088 | 8/1973 | Osdor | 159/18 X |

Primary Examiner—Jack Sofer
Attorney, Agent, or Firm—Craig & Antonelli

[57] ABSTRACT

A column for the distilling of brine, comprising a vertical cylindrical casing, condensing means in its central part and a series of substantially horizontal floors limiting, between them, a plurality of successive distilling chambers, characterized by the flow in a thin sheet of the brine to be evaporated on its vertical inside wall, by the conveying of the distilled liquid on the vertical tubes of the condenser situated towards the center and on which are fixed the successive floating floors having two opposite slopes, the one directing the brine towards the periphery, and the other directing the distilled liquid towards the center.

12 Claims, 8 Drawing Figures

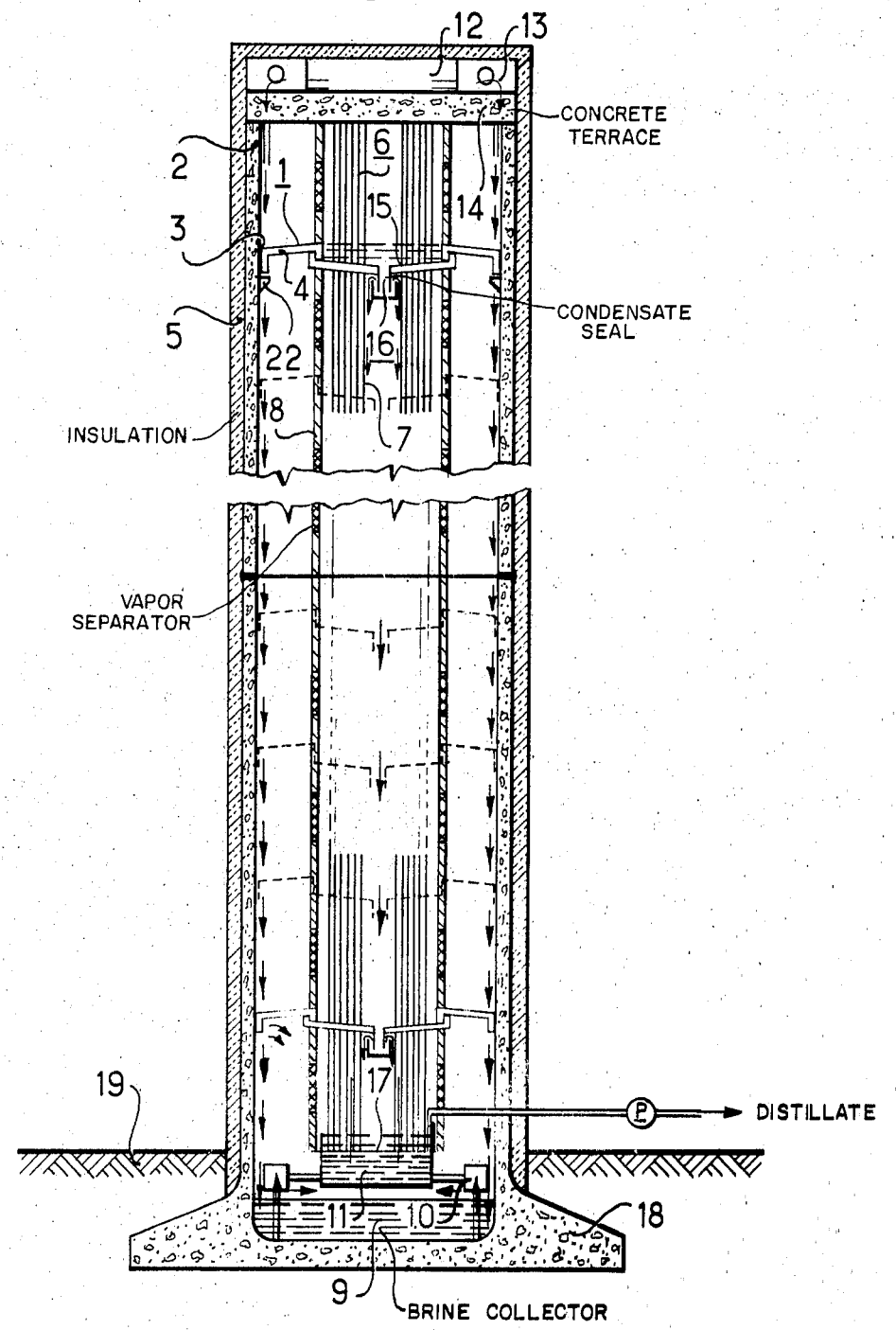

VERTICAL, MULTISTAGE-FLASH, FALLING FILM COLUMN FOR DISTILLING BRINE

The present invention concerns the structure of a vertical distilling column made of pre-stressed concrete and having multiple stages, for a liquid charged with salt or brine, in a distilling device having a series of cylindrical columns, for example, high-pressure, medium-pressure and low-pressure columns, and refers more particularly to the case where each of the columns is divided up by horizontal floors limiting the successive distilling chambers.

It is known that the majority of known installations of that type, more particularly for desalting sea water, comprise a succession of cells in which the temperature and the pressure gradually decrease, arranged in rows one beside another on a horizontal plane.

A few installations in which the distilling device consists of vertically superimposed cells, one of these in particular having prismatic columns, evaporation taking place in the axis of symmetry and condensation taking place at the periphery of the columns juxtaposed in great numbers in parallel so as to reduce the distance between the evaporator and the condenser and to decrease the heat consumption to increase the efficiency thereof, are also known; but the accuracy required to take advantage of the theoretical advantages of such installations singularly complicates the practical methods for the manufacturing thereof.

The most frequent disadvantage of vertical symmetry installations resides more particularly in the difficulty in ensuring, simply, the flow of the two fluids contained in the installation, on a strictly independent basis with respect to each other, on the one hand, the brine to be evaporated, and on the other hand, the distilled liquid to be collected.

The object of the present invention consists precisely in organizing a simplified flow of the fluids quite independently, and taking into account the vertical structure of the installation; the brine trickling vertically at the periphery on the inside wall of the column, and the condensed liquid flowing in the center along the vertical faces of the condenser, each circuit being subjected, on passing the separation panel between two neighboring cells, to the minimum discontinuity compatible with the liquid seal suitable for maintaining the fluid-tight sealing required between the said cells.

The essential feature of the structure of a distilling column according to the invention resides in the fact that the vertical inside wall of the peripheral casing ensures the flow of the brine in a thin sheet and in that the vertical walls of the condensation means crossing right through the successive floors take part in the conveying of the distilled liquid, and in that the floors have cylindrical symmetry and are installed floating inside the casing, whereas means enable them to ensure the fluid-tight sealing of each of the floors between the two adjacent superimposed distilling chambers which they limit.

The steam-tight sealing of the enclosure is necessary. The outline in the shape of a thin vertical cylindrical veil having a zero horizontal bend moment under the effect of outside forces due to inside charges and pressures, and under the effect of the difference of the inside and outside temperature, reduces the causes of cracking.

The prestress necessary for ensuring fluid-tight sealing of the concrete is ensured in the vertical direction by the charges themselves, and in the horizontal direction by outside overpressure and by peripheral cables.

The aims and advantages of the present invention will become more apparent from the following description of an embodiment of the apparatus and with reference to the accompanying drawing, in which:

FIG. 1 shows a partial sectional view of one of the distilling columns according to the invention.

FIG. 3 shows a horizontal sectional view along III—III in FIG. 2a.

Figure 1A:
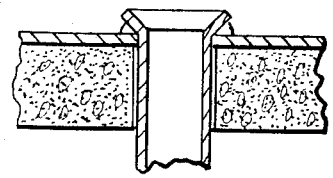
FIG. 1a is an enlargement showing the interconnection of a condenser tube and the upper water box according to the invention.
Figure 1B:
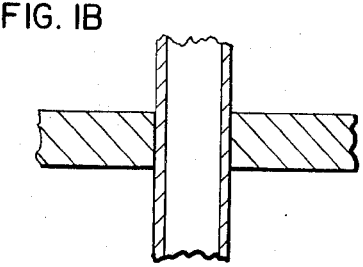
FIG. 1b is an enlargement showing the interconnection of a condenser tube with a chamber floor according to the invention.
Figure 1C:
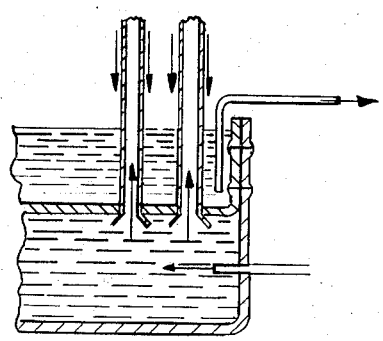
FIG. 1c is an enlargement showing the interconnection of condenser tubes and the lower water box according to the invention.

In FIG. 1 there is shown one of the vertical cylindrical concrete columns placed side by side and connected up in series to effect the distilling of brine by the method of successive evaporations and expansions called "multi-stage flash".

Each column is divided by substantially horizontal floors or walls 1, independent from the casing 2 of the column and surrounded by spillways or peripheral gutters 3 acting, moreover, as liquid air-tight and steam-tight seals. The stages limited by these walls 1 form chambers kept at decreasing pressures and enabling evaporating by successive peripheral "flashes," for the brine whose temperature decreases from the upper stages to the lower stages. The brine then trickles in each stage down to the peripheral part 4 of the lower floor sloping towards the gutters 3 feeding the following stage with brine. An outside insulation 5 reduces the heat losses of the device, whose efficiency it thus improves.

A central condenser 6, in the axis of the column, consists of tubes 7 made in a single part and having very great length, passing through the floors 1 in a fluid-tight manner.

A vertical cylindrical steam separator 8, not bearing any weight, protects the condenser 6 from being splashed with droplets of brine during the flash evaporation.

The brine trickling from stage to stage is collected in a receptacle 9 at the foot of the column.

The brine in the lowermost chamber 9 is drawn up by pumps 10 which force it from the lower water box 11 to the upper water box 12 of the condenser 6 via conduit means 7. It is noted that the expression "water box" refers to a box for containing brine.

The brine finishes heating itself up in an exchanger 13 situated on the terrace 14 at the top of the head column which is at the highest temperature and highest pressure in the system.

The condensed fresh water is collected in the central portion 15 of each lower floor of a chamber which slopes towards the axis of the column; then it goes down from stage to stage due to siphons 28 with or without metallic or plastic circular spillway bins acting, moreover, as liquid seals.

On flowing down over the tubes of the condenser 6, the distilled liquid enables the recuperation of the remaining calories before being collected at the foot of the column at 17, whence it is drawn off by additional means.

The casing of a column rests on a circular foundation 18 forming an apron and cast into place, possibly resting on a circle of piles if the ground 19 requires it.

The casing 2 of the column is made of concrete, with climbing or sliding coffer work (scaffolding), leaving steelwork pending if necessary, and coated with a layer 5 of heat insulator.

Figure 2A:
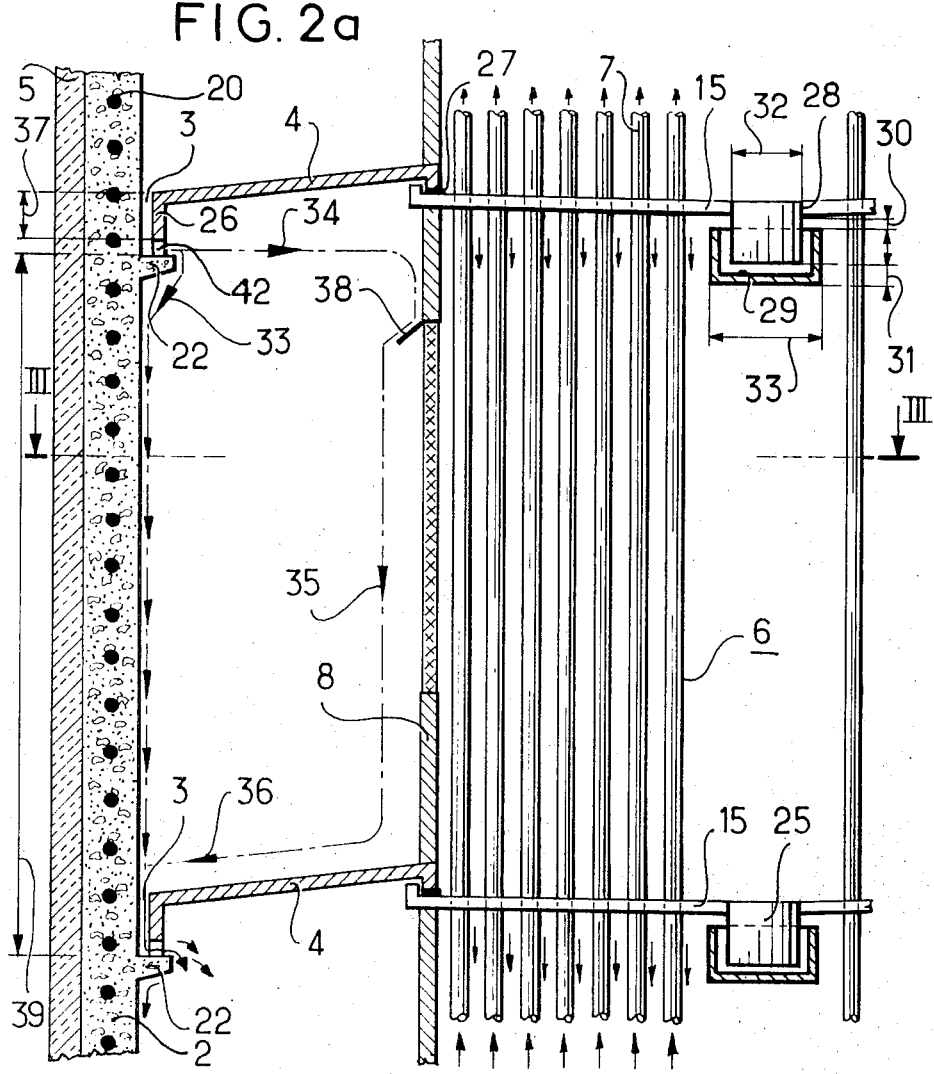
FIG. 2a is an enlarged view of a portion of the apparatus shown in FIG. 1 located between two successive floors and forming one of the distilling chambers.

In FIG. 2a, layers of cable 20 whose density increases upwards, because of the high temperature and pressure, ensure horizontal pre-stressing of the column, if need be.

Figure 3:
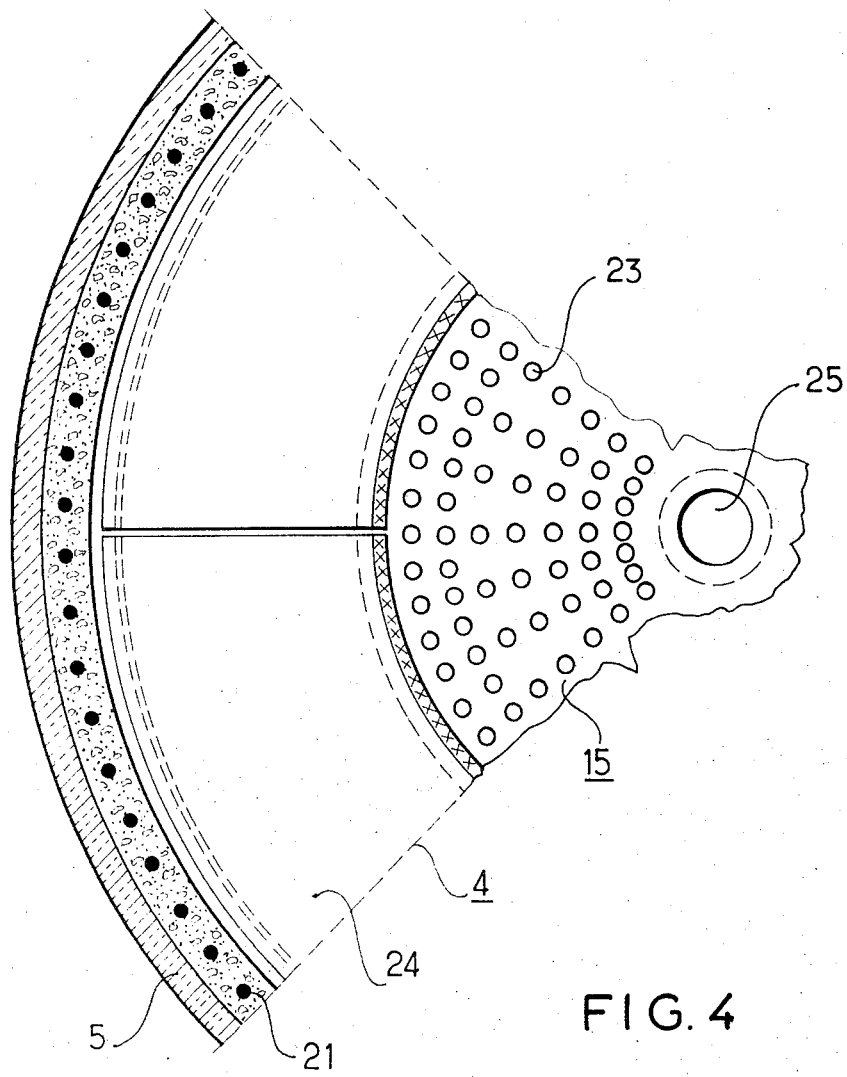

In FIG. 3, the bars 21 installed in the advanced portion may ensure extra vertical pre-stress in the column, in the case where this is necessary.

The peripheral rims 22 supporting the floors 1 and forming a threshold for the flashes, are made of prefabricated concrete. They are fixed by stainless metal bolts or cemented with resin. They may be made of resinous concrete if this is justified by the wear of the flash. They may be cast into place on successive scaffoldings, using pending steelwork in the casing.

The upper terrace (terrasse) 14 made of concrete is cast into place on scaffoldings propped up on the column 2. It rests on the column 2 by means of a peripheral seal and is itself pre-stressed by a network of orthogonal cables, except in the case where it is formed in the shape of a cup.

A gauge makes it possible to position tube guides accurately on the level of the position of each tube 7 of the condenser 6.

The floors 1 between stages are prefabricated. They comprise a central circular element 15 and a peripheral circle 4 divided into segments 24.

The central element 15 made of pre-stressed or non pre-stressed concrete, metal or reinforced plastic, has holes 23 for the tubes 7 of the condenser 6 to pass through. They have been reserved for prefabrication with very great accuracy both for position and for diameter. They may be provided with plastic bushes or bushings.

At the center of the element 15, an opening 25 enables the discharging of the distilled liquid.

The peripheral segments 24 made of concrete, fibrocement, metal or plastic comprise a vertical rim 26 constituting one of the walls of the peripheral gutter.

Figure 4:
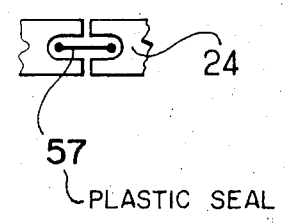
FIG. 4 is the detail of the fluid-tight seal formed between two peripheral segments of a floor.

In FIG. 4, the plastic seals 57 on the level of the middle of the thickness of the segments 24 and having a tendency to swell when in contact with moisture and heat, ensure radial fluid-tight sealing between these latter segments.

One of the segments, not shown, is smaller, easier to handle, acts as a manhole and enables maintenance flow from one stage to the other, and is installed only at the end of assembly. The peripheral segments 24 rest freely on the central element by means of a plastic seal 27 compressed by the differences in pressure between stages and constituting an articulation. These various plastic seals enable the expansion of the floors without danger of cracking and ensure air-tight sealing.

The tubes 7 of the condenser 6 are made of aluminium alloy, available in great lengths, wound in a coil. They are used for supporting the floors 1 by friction within the holes 23, possibly provided with bushes, or by pressure on collars, and, as they cannot operate when compressed without buckling, they hang from the upper water box 12 which rests on the terrace floor 14.

As the coefficient of expansion of aluminium is twice that of concrete, the lower water box 11 must hang from the tubes 7 which may thus stretch freely when the installation is put into operation. The central element 15 of the floors 1 lowers without difficulty due to the plastic seal 27 which separates it from the peripheral segments 24.

Fluid-tight sealing between stages is ensured by the friction tubes through the floors, possibly assisted by through bushes, not shown.

The assembling of a column, after preparation of the prefabricated elements it comprises is effected simply by the following sequence of operations:

The foundations are formed with the apron 18 and the casing 2 of the column, which is coated with a layer 5 of heat insulation.

Then:

The fixing of the peripheral rims 22 is effected;

And the central elements 15 of the floors 1, are located inside the casing 2;

Then, the peripheral segments 24 also piled on the periphery of the apron 18 are stowed away;

The terrace 14 is then formed and the upper water box 12 is installed without its lid.

Figure 2B:
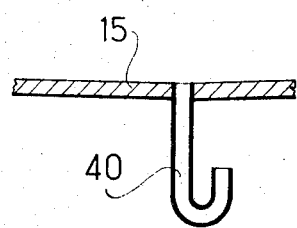
FIG. 2b shows a variant of a central siphon for communication between two chambers.

The following operations are effected:

Lifting of the uppermost central floor and, by means of cables passing through the holes 23 for the tubes 7, it is fixed in its final position, after guiding and adjusting with three plumb lines passing through three holes 23, by means of horizontal jacks resting on the casing 2;

Lifting and fixing of the other floors, followed by fixing of the siphons formed by tubes 28 and bins 29, under the central elements 15 of the various floors 1. These siphon bins may be replaced by simple siphons 40 in high-pressure low-discharge stages, according to the sketch in FIG. 2b.

Lifting and installing of the segments 24 of the peripheral ring 4 of the floors 1, beginning with the uppermost stage.

Then, the following operations are followed:

Unrolling, re-calibrating (necessary reforming) and drawing of the tubes 7, previously brought in rolls onto the apron 18 of the column 2. Drawing is effected vertically through the floors 1 by a winch fixed to the terrace 14. The unwinding device is placed accurately for the drawing of each tube 7. The upper end of each tube 7, after having crossed through the terrace 14, is fixed on the water box 12 by known means, more particularly by "dudgeoning" ensuring a resistance corresponding to at least a third of the yield strength of the tubes 7. Then, the cables which, at the outset, supported the floors 1, as well as the horizontal jacks, are removed.

Lastly, the lower water box 11 is fixed, for example by dudgeoning of the tubes 7.

When placed in operation, to enable the creating of the required pressures between the various stages, it is necessary to remove the intercommunications between the stages. The siphons with their tubes 28 and spillway bins 29 of the distilled liquid circuit are filled with liquid. Their depth is variable from one stage to another, but still greater than the difference in pressure between the stages situated on either side. That depth is adjusted by setting the dimensions, respectively 30 and 31, representing respectively the distance from the top edge of the bin 29 to the lowest point of the floor 15, and the distance from the bottom of the tube 28 to the bottom of the bin 29; whereas the discharge from the siphon depends on two parameters: the diameter 32 of the tube 28 and that, 33, of the bin 29.

Before putting the air pump degassing device into operation, the flow of the brine at atmospheric pressure is started up. If the discharge were that of normal operation, the water pressure on the threshold 32 of the "flash" would have to be substantially equal to its value when in operation, for each stage; the peripheral gutter 3 should therefore have a minimum depth of $\Delta p + h$, $\Delta p$ being the difference in pressure between consecutive stages and $h$ being the water clearance when the brine is evaporated through the hole 42, comprised between the rim 22 and the vertical rim 26 of the floor 4.

To avoid having such a great gutter depth, used only on starting up, only a fraction of the final discharge of brine will be made to flow at atmospheric pressure, so as to maintain at the vertical rims 26, reasonable heights.

The pressurizing and depressurizing of the cells will be effected subsequently in steps corresponding to fractions of the final rate, and the discharge of brine will be increased, in parallel, in steps. For that purpose, either several pumps, brought into action successively, or variable flow pumps, must be available. A level of water is maintained in the gutters, whose depth could be reduced to:

$(\Delta p/K) + h$, K being the coefficient of reduction in the difference of pressure between stages enabled by the reduction in discharge of the brine on starting up.

It will be observed that in that embodiment, the length of the flash of each stage is very great. It is therefore effected with a very thin sheet of brine, this reducing the difference between the temperatures of the steam and the brine, at a determined pressure, and improves the efficiency thereof. The spraying flash or stream of brine, formed at the outlet 42, is distributed in two extreme directions shown respectively by the arrow 43, to produce the very thin sheet on the inside wall of the casing 2, and by the arrows 34, 35 and 36 and come together again towards the peripheral gutter 3. The protection of the condensation space with respect to the droplets of brine is ensured by the cylindrical separator 8 closed at its two ends and provided with openings in its mid portion protected by the deflector plate (louvre) 38.

The loss of head due to the vertical configuration of the installation is compensated by the reduction in the losses due to the rectilinear arrangement of the tubes 7 of the condenser 6. The rectilinear arrangement of these tubes leads to a reduction in their clogging coefficient and hence to the increase in the overall conduction coefficient of the condenser. The flow speed of the brine, and consequently, the height 39 of the stages, and hence the total height of the columns, may then be reduced.

It will also be observed that the flash passage sections and the distilled liquid sections are not influenced by coefficients of expansion different from those of the materials with which they come into contact, more particularly by reason of the floating and articulated assembling of the floors, and the adjustment thereof is independent from temperature.

For each column, a different thermal gradient between stages may be adapted, so as to have a better distribution of the differences in pressure.

A difference of approximately one degree centigrade could be adopted for the high-pressure column which has been shown, and two degrees centigrade could be exceeded for the column at the lowest pressure.

The assembling method for the inside structure of a column, such as described, is particularly fast with prefabricated elements for which various materials may be selected according to the requirements of the various component parts.

The use of rolled tubes, straightened out in situ inside the column makes it possible to avoid the trouble of lifting very long thin tubes to insert them in the column, as this would require a crane jib with a height more than twice that of the column, and any accidental bending of the tubes is thus avoided.

The friction of the tubes on the floors between stages is used simultaneously for supporting these floors and for obtaining satisfactory air-tight and water-tight sealing. The friction coefficient increases when the temperature rises, and also, when, with time, surface etching of the materials occurs, this leading to an increase in the reliability of the device in the course of time.

The geometrical shape of the column and its structure are particularly effective for cancelling the detrimental effects of the thermal stresses.

Indeed, the apron of a column is buried and its temperature is even, in its portion forming a cup, and therefore does not set any problems of expansion differential. The absence of connection between the casing and the floors cancels the danger of cracking due to charges and to differential expansions; moreover, the bearing points of the floor elements are small. The casing of the column is freely expandable and subjected to efforts which vary progressively: weight, inside pressure, thermal expansion, effect of wind. It is easy to pre-stress it to cancel all the traction efforts, all the more so as thermal stresses and stresses due to pressure increase upwards, whereas stresses due to wind decrease. Thermal stresses result in a traction on the outside face of the casing; the horizontal cables are therefore placed, to great advantage, on the outside, so as to be protected from etching by brine, by a great thickness of concrete.

Lastly, the inside walls of the enclosure, kept evenly damp by the trickling of brine, may be considered air tight, this quality being combined with the absence of a negative stress coefficient, by reason of the adjustment, adapted to the physical conditions prevailing at each level, of the horizontal pre-stress.

This device, which is applicable to the distilling of all liquid containing dissolved salts, is particularly suitable for the desalting of sea water and the corresponding production of fresh water.

Lastly, needless to say, numerous modifications to the embodiment described, which may be contemplated by the man skilled in the art, come within the scope of the invention corresponding to the general definition given of the present invention. Thus, with a view to reducing the height of the distilling column, the heat exchange may be improved during the condensation by the use of corrugated tubes, known per se, in the condenser.

The upper terrace, freely pressed, by means of a seal, on the casing, ensures the vertical pre-stress, thereof by the charges it transfers to them.

The casing is reinforced, at its connection, by the foundations, so as to be able to absorb the moments due to small deformations of the latter, by reason both of the charges and of the thermal phenomena.

While the novel embodiments of the invention have been described, it will be understood that various omissions, modifications and changes in these embodiments may be made by one skilled in the art without departing from the spirit and scope of the invention.

What is claimed is:

1. A vertical distilling column comprising:
   a vertical casing with a central portion,
   vertically extending condensing means having tubular walls for flow of liquid to be preheated therethrough located in the casing,
   a series of substantially horizontal floor means arranged one below the other within the casing and limiting therebetween a plurality of distillation chambers each having a condensing region and an evaporating region with the tubular walls of the condensing means extending through successive floor means in floor supporting relationship therewith such that the floor means are movably supported with respect to the casing, whereby the floor means are permitted to move axially within the casing due to axial movements of the condensing means during distillation, and
   means for placing the distillation chambers in sealed liquid flow communication with one another in use whereby a portion of the liquid to be evaporated flows down an interior wall of an evaporating region and condensed purified liquid flows downwardly through successive condensing regions downwardly through the column in non-mixing relationship with the flow of liquid to be evaporated in use.

2. The column of claim 1, wherein the floor means consist of two sections, a central section located centrally within said casing, having an outer edge portion, and being sloped so as to collect condensed liquid in the central portion of the casing, and a peripheral section located peripherally of said central section with a slope opposite that of said central section so as to draw liquid to be evaporated towards the periphery of the casing.

3. The column of claim 2, wherein the condensing means comprises a plurality of cooling tubes, and wherein each central floor section is fixedly attached to the cooling tubes and includes liquid seal means for permitting condensed purified liquid to flow from central floor section to central floor section downwardly through the casing.

4. The column of claim 3, wherein the liquid seal means consists of a central tube and a spillway bin in which the central tube is immersed.

5. The column of claim 4, wherein the height of the liquid seal means is adjusted for each floor means by setting the position of the bin with respect to the tube.

6. The column of claim 5, wherein each peripheral floor section is subdivided into segments connected to one another by radial seals.

7. The column of claim 2, wherein an inner edge portion of the peripheral floor section rests on the outer edge portion of the central floor section via a seal, and a downwardly extending outer edge portion of the peripheral floor section rests on a rim fixed to the inside of the casing of the column so as to form an annular liquid flow opening, as well as, a liquid seal ring with a given height for sealing against flash evaporation being effected between the rim and the outer edge portion.

8. The column of claim 7, wherein the height of the seal ring and the flow opening are determined for each chamber.

9. The column of claim 14, wherein the condensing means consists of vertical tubes fixed to an upper water box which rests on an upper terrace within the casing, the tubes supporting the floor means as well as a lower water box so as to ensure, by their combined weight, a vertical pre-stress of said casing.

10. The column of claim 9, wherein peripheral rims are fixed to an inside wall of said casing.

11. The column of claim 1, wherein the column consists of pre-stressed concrete for distilling said liquid to be evaporated which is charged with salt.

12. The column of claim 11, wherein the means for placing the chambers in liquid flow communication includes means for ensuring a flow of the brine in thin sheets down the inside wall of the casing, and wherein means are provided for ensuring fluid-tight sealing of the successive floor means defining the chambers.

* * * * *